(12) United States Patent
Corrington et al.

(10) Patent No.: US 7,398,472 B2
(45) Date of Patent: Jul. 8, 2008

(54) DEFINING THE VISUAL APPEARANCE OF USER-INTERFACE CONTROLS

(75) Inventors: Robert E. Corrington, Kirkland, WA (US); Song Zou, Issaquah, WA (US); Kathryn G. Rasmussen, Edmonds, WA (US); Thomas J. Layson, Monroe, WA (US); Gamage I. Viriththamulla, Kenmore, WA (US); Derek R. Westcott, Kirkland, WA (US); Diane Shambaugh, Redmond, WA (US); Jalayne Taber Boni, Shoreline, WA (US); Seung M. Yang, Bothell, WA (US); Paul L. Cutsinger, Redmond, WA (US); Robert David Rugge, Redmond, WA (US); Douglas Koenig, Redmond, WA (US); Nathan William Bower, West Lafayette, OH (US); Mun (Scott) Ying Leong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 10/888,045

(22) Filed: Jul. 9, 2004

(65) Prior Publication Data

US 2006/0010374 A1    Jan. 12, 2006

(51) Int. Cl.
*G06F 3/00* (2006.01)
*G06F 3/14* (2006.01)

(52) U.S. Cl. .................. 715/762; 715/744; 715/765; 715/235; 715/234

(58) Field of Classification Search ............ 715/733, 715/744, 760, 762, 764, 765, 835, 846, 866, 715/501.1, 513, 542, 205, 234, 269
See application file for complete search history.

(56) References Cited

U.S. PATENT DOCUMENTS 5,428,730 A    6/1995   Baker et al.
6,327,628 B1 *  12/2001  Anuff et al. ................ 719/311

(Continued)

OTHER PUBLICATIONS

Maurer, Peter M. et al., "Component-Level Programming: A Revolution in Software Technology", Department of Computer Science & Engineering, University of South Florida, Tampa, FL, Nov. 1999.

(Continued)

*Primary Examiner*—X. L. Bautista
(74) *Attorney, Agent, or Firm*—Birch, Stewart, Kolasch & Birch, LLP

(57) ABSTRACT

Systems and methods for defining at least one visual-display characteristic of at least one user-interface control are disclosed. In accordance with various embodiments of the invention, a dialog template specifies at least one style selector for the at least one user-interface control. A transformation module extracts the at least one style selector from the dialog template. A style sheet defines at least one visual-display-characteristic value that is applicable to the at least one user-interface control and that is associated with the at least one style selector. A style sheet-parsing engine uses the at least one style selector to retrieve the at least one visual-display-characteristic value from the style sheet. And a user-interface-control-drawing module draws the at least one user-interface control in accordance with the at least one visual-display-characteristic value retrieved by the style sheet-parsing engine.

31 Claims, 9 Drawing Sheets

U.S. PATENT DOCUMENTS

| | | | |
|---|---|---|---|
| 7,028,262 B2* | 4/2006 | Estrada et al. | 715/751 |
| 2001/0020956 A1* | 9/2001 | Moir | 345/765 |
| 2002/0010717 A1* | 1/2002 | Breuer et al. | 707/517 |
| 2003/0231204 A1* | 12/2003 | Hanggie et al. | 345/744 |
| 2004/0111673 A1* | 6/2004 | Bowman et al. | 715/513 |
| 2005/0050474 A1* | 3/2005 | Bells et al. | 715/747 |
| 2005/0108648 A1* | 5/2005 | Olander et al. | 715/744 |

OTHER PUBLICATIONS

Platt, David S., "ASP.Net—Develop Polished Web Form Controls the Easy Way with the .Net Framework", MSDN Magazine: The Microsoft Journal for Developers, Jun. 2002.

* cited by examiner

DEFINING THE VISUAL APPEARANCE OF USER-INTERFACE CONTROLS

TECHNICAL FIELD

Embodiments of the invention relate to computer user interfaces. In particular, embodiments of the invention relate to defining the visual appearance of user-interface controls.

BACKGROUND OF THE INVENTION

Various subjects are discussed throughout this document in the context of a financial application program that displays platform-specific (e.g., Win32®-based) user-interface (UI) controls and UI controls on HTML pages. Principles of the invention, however, are applicable to other types of application programs and other environments and technologies, including, but not limited to Unix-based operating systems, X11/Motif, and Java applets.

Windows® provides several predefined window classes for common controls, such as buttons, check boxes, toolbars, menus, etc. Controls belonging to these window classes are called predefined controls. An application program may create a predefined control of a particular type at run-time (via the CreateWindowEx function) or may create controls as components of a predefined dialog template from a resource file or other source.

Win32®-based applications and HTML pages may use common controls to present information to a computer user. In many cases, the user can modify the information and/or perform commands. For example, a user of a financial application program may press the Print toolbar button to print a report, click an OK button to confirm the deletion of an electronic-bill-payment schedule, or change the check number on a transaction.

Win32®-based applications and HTML pages instruct Windows® which controls to use and where the controls should appear in the dialog or on the page. By default, the visual appearance of the controls is set by Windows®. For example, prior to Windows® XP, buttons were typically shown as black text on a gray background with a 3D border.

Referring to FIG. 1, the first row of buttons shows the default color scheme for the standard buttons provided in Windows® 95, Windows® 98, Windows® ME, and Windows® 2000. Users can change the default visual appearance of Windows via a Display Control Panel Applet, an example of which is shown in FIG. 2. Using such an applet, users can make limited system-wide changes to the default colors, fonts, and styles of UI components.

Referring again to FIG. 1, the second row of buttons shows buttons in the Plum color scheme and the third row shows buttons in the high contrast white color scheme. The bottom row of buttons shows the standard buttons in the Olive color scheme offered by Windows® XP.

In some cases, Win32®-application developers and HTML-page authors may want to go beyond default appearances provided for UI controls, such as the default button-color schemes shown in FIG. 1, and create a unique visual appearance for various UI components.

Developers can set properties on the common controls and let Windows draw the control, or they can write additional code to draw the control themselves. If the developer wants to customize a common control beyond what's currently possible or wants to create a new control, such as a date-edit control with a drop-down calendar, an example of which is shown in FIG. 3, the developer would typically have to write additional code to draw the control as well as handle input messages originating from input devices, such as a keyboard and mouse.

As an example that shows the difference between standard controls and custom controls, compare the dropdown lists and buttons in the Windows® XP Display Control Panel Applet shown in FIG. 2 with the Microsoft® Money 2004 Options dialog shown in FIG. 4. In the Display Control Panel Applet of FIG. 2, the controls have a 3D appearance and in the Money 2004 Options dialog of FIG. 4 the controls appear 2D or "flat." In the Display Control Panel Applet of FIG. 2, Windows has drawn the user interface controls, and in the Money 2004 Options dialog of FIG. 4, Microsoft® Money has drawn custom controls.

Through setting properties and writing code, Win32®-application developers and HTML-page authors can override the Windows® defaults and customize the visual appearance of their products. The various technologies typically used by Win32®-application developers and HTML-web-page authors are very different, which is unfortunate if it is desired to present HTML- and Win32-based content side-by-side, and to reduce the development and maintenance costs of doing so.

Win32®-application developers typically use Windows® Resource files to specify a list of controls in a dialog and their layout. Developers also typically write the application's source code in C/C++, Visual Basic®, and/or one or more other suitable source-code languages.

HTML offers a limited set of properties that can be changed to modify the visual appearance of common controls. Through clever conventional use of HTML, Cascading Style Sheets (CSS), and JavaScript (TM), HTML-page authors have been able to simulate some user-interface controls such as fly-out menus and tree controls, but these implementations are typically limited and do not offer the same high-fidelity user experience supported by Windows® common controls or custom controls developed by Win32®-application developers. Instead, HTML-page authors use Win32®-based technologies like ActiveX® technologies to create custom controls.

Based on the foregoing discussion, a unifying technology solution that both Win32®-application developers and HTML-page authors can easily use would be desirable.

In addition, when setting properties on conventional UI controls, properties are typically set on individual controls. Being able to set properties on groups of controls would be desirable.

SUMMARY OF THE INVENTION

Conventional application programs are typically built either to run in an environment such as one of the Windows® operating systems or to run in a browser (i.e., a platform-agnostic application that can run on many different computing platforms). When applications are developed, developers typically take an "either-or" position. They either build a platform-specific application (e.g., a Windows® application) or a browser-based application.

An application program that blends these two types of target environments both from a user-experience perspective as well as a development technology perspective would be advantageous. One of the advantages of such an application program is being able to ease the transition from one technology to the other such that the user doesn't notice. And the differences, from an implementation perspective with respect to visual-display logic (e.g., colors, layouts, fonts, and images), between the Windows®-like portion and the HTML-based portion may be insulated (i.e., abstracted) from the application's developers.

Embodiments of the invention advantageously provide a way to specify that a particular user-interface control, such as a button, should look different than standard UI controls, such as standard buttons. A finer level of control of the visual appearance of user-interface controls is provided relative to what application developers are conventionally accustomed to.

Systems and methods for defining at least one visual-display characteristic of at least one user-interface control are disclosed. In accordance with various embodiments of the invention, a dialog template specifies at least one style-class attribute for the at least one user-interface control. A transformation module extracts the style-class attribute from the dialog template. A style sheet defines at least one visual-display-characteristic value that is applicable to the user-interface control and that is associated with at least one style selector, which includes the at least one style-class attribute and/or at least one tag name for the user-interface control. A style sheet-parsing engine uses the style selector to retrieve the visual-display-characteristic value from the style sheet. And a user-interface-control-drawing module draws the user-interface control in accordance with the visual-display-characteristic value retrieved by the style sheet-parsing engine.

Additional features and advantages of the invention will be apparent upon reviewing the following detailed description.

DETAILED DESCRIPTION OF THE INVENTION

I. Introduction

Figure 3:
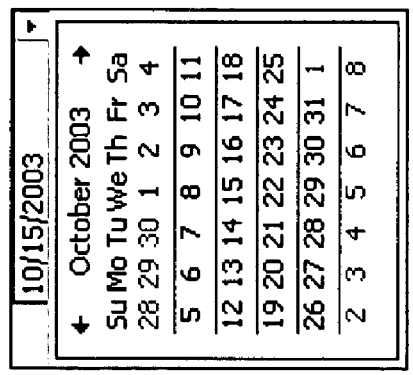
FIG. 3 shows an example custom control in the form of a date-edit control with a dropdown calendar.
Figure 1:
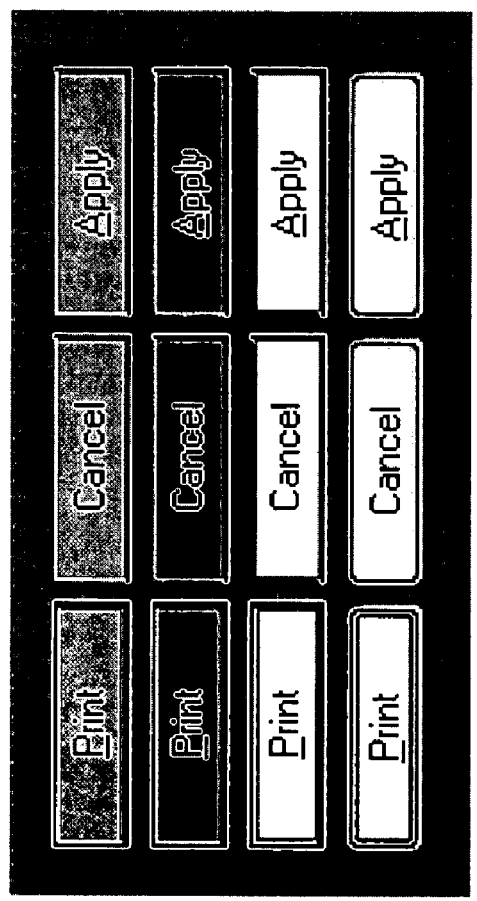
FIG. 1 shows various standard color schemes of User Interface (UI) control buttons.

An application program developed with modifiable controls, in accordance with various embodiments of the invention, may advantageously: (1) provide a common way to define the visual appearance of user-interface (UI) controls displayed on an HTML page and UI controls of a platform-specific application program; and (2) reduce the time and expense required to change the visual appearance of the application. An added benefit is enabling individuals who do not have detailed knowledge of the code of the application program to highly customize the visual appearance of the application program's user interface without required recompiling of the application or developing custom code.

By editing a text file (style sheet) and optionally providing graphics elements, including, but not limited to, bitmaps, a person can substantially change the visual appearance of the platform-specific display pages and HTML-based pages within an application program. In addition, a third-party developer, such as a financial institution, can create its own style sheet to make the application look like its own existing web site.

Partnering with third-party vendors of application programs may extend the reach of a software vendor's product and create additional revenue opportunities for the vendor. For example, by offering a personal finance web site and a platform-specific application that can easily be highly customized to suit the needs of financial institutions, a software vendor can become a strategic value-add technology provider to the financial institutions and their customers. Modifiable controls in accordance with various embodiments of the invention enable a software vendor to create easily customizable HTML pages and highly customizable application programs in a flexible and cost-effective manner.

In accordance with various embodiments of the invention: style sheets are used to describe control properties across platform-specific (e.g., Win32®-based) UI display pages and HTML-based pages; a simplified approach is provided for describing control properties; a set of control properties enables a platform-specific application to look, feel, and navigate like a wide range of Web sites, such as financial-institution Web sites; and controls can be grouped together and share common property values efficiently through a hierarchical model that is similar to the model used by Cascading Style Sheets.

II. Exemplary Operating Environment

The invention will be described in the general context of computer-executable instructions, such as program modules, that are executed by a personal computer or a server. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media, which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 5:
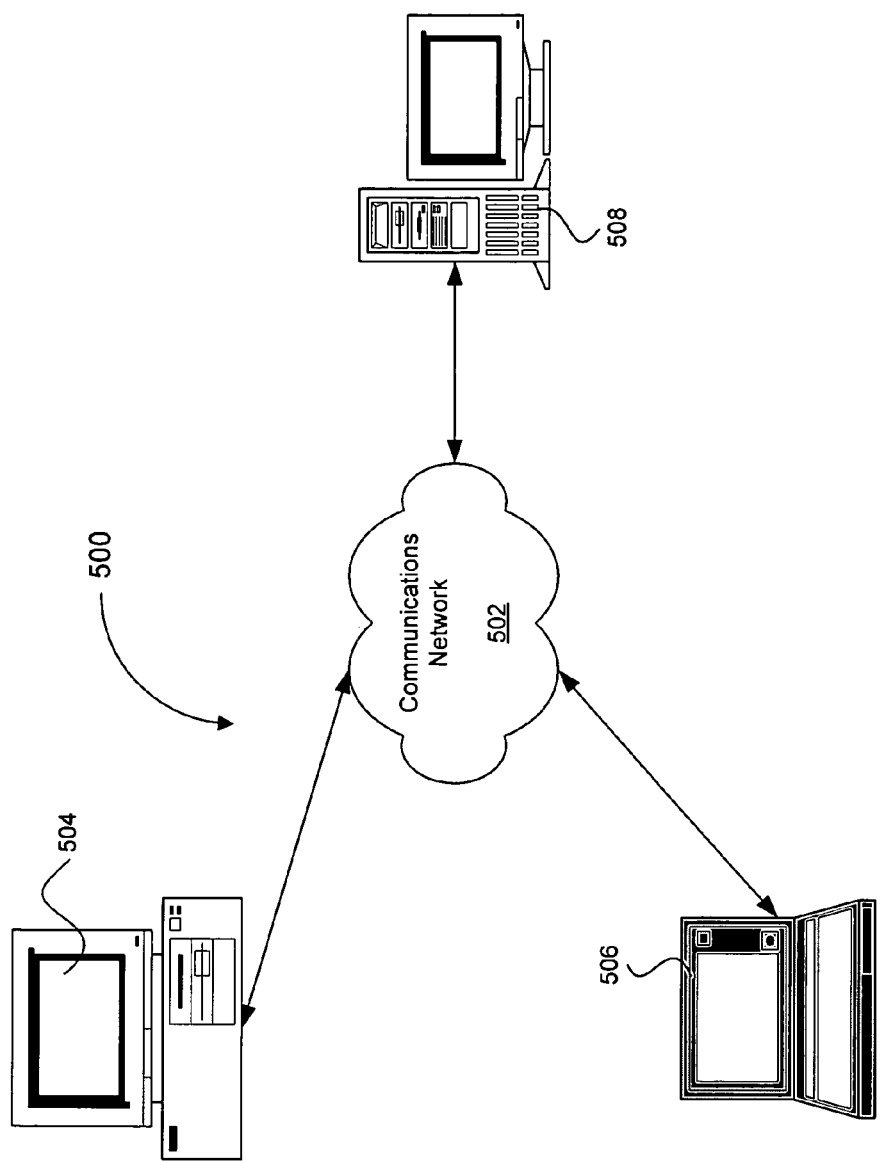
FIG. 5 illustrates an example of a suitable distributed computing system operating environment in which the invention may be implemented.

FIG. 5 illustrates an example of a suitable distributed computing system 500 operating environment in which the invention may be implemented. Distributed computing system 500 is only one example of a suitable operating environment and is not intended to suggest any limitation as to the scope of use or functionality of the invention. System 500 is shown as including a communications network 502. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services. Systems may also include more than one communication network, such as a LAN coupled to the Internet Computer device 504, computer device 506, and computer device 508 may be coupled to communications network 502 through communication devices. Network interfaces or adapters may be used to connect computer devices 504, 506, and 508 to a LAN. When communications network 502 includes a WAN, modems or other means for establishing communications over WANs may be utilized. Computer devices 504, 506 and 508 may communicate with one another via communication network 502 in ways that are well known in the art. The existence of any of various well-known protocols, such as TCP/IP, Ethernet, FTP, HTTP and the like, is presumed.

Computers devices 504, 506, and 508 may exchange content, applications, messages and other objects via communications network 502. In some aspects of the invention, computer device 508 may be implemented with a server computer or server farm. Computer device 508 may also be configured to provide services to computer devices 504 and 506. Alternatively, computing devices 504, 506, and 508 may also be arranged in a peer-to-peer arrangement in which, for a given operation, ad-hoc relationships among the computing devices may be formed.

III. Using Modifiable Controls on Win32 Display Pages

To create a display page, such as a dialog, for a Windows®-operating-system-based application, a developer typically uses a WYSIWYG ("what you see is what you get") dialog editor such as the one included in Microsoft's Visual Studio® development system. The dialog appears as a large blank canvas. The developer picks UI controls from a palette and places them on the dialog in the desired locations. The developer can also use the dialog editor to set additional properties such as text alignment, font styles, background colors and images, and text transformations.

Figure 6:
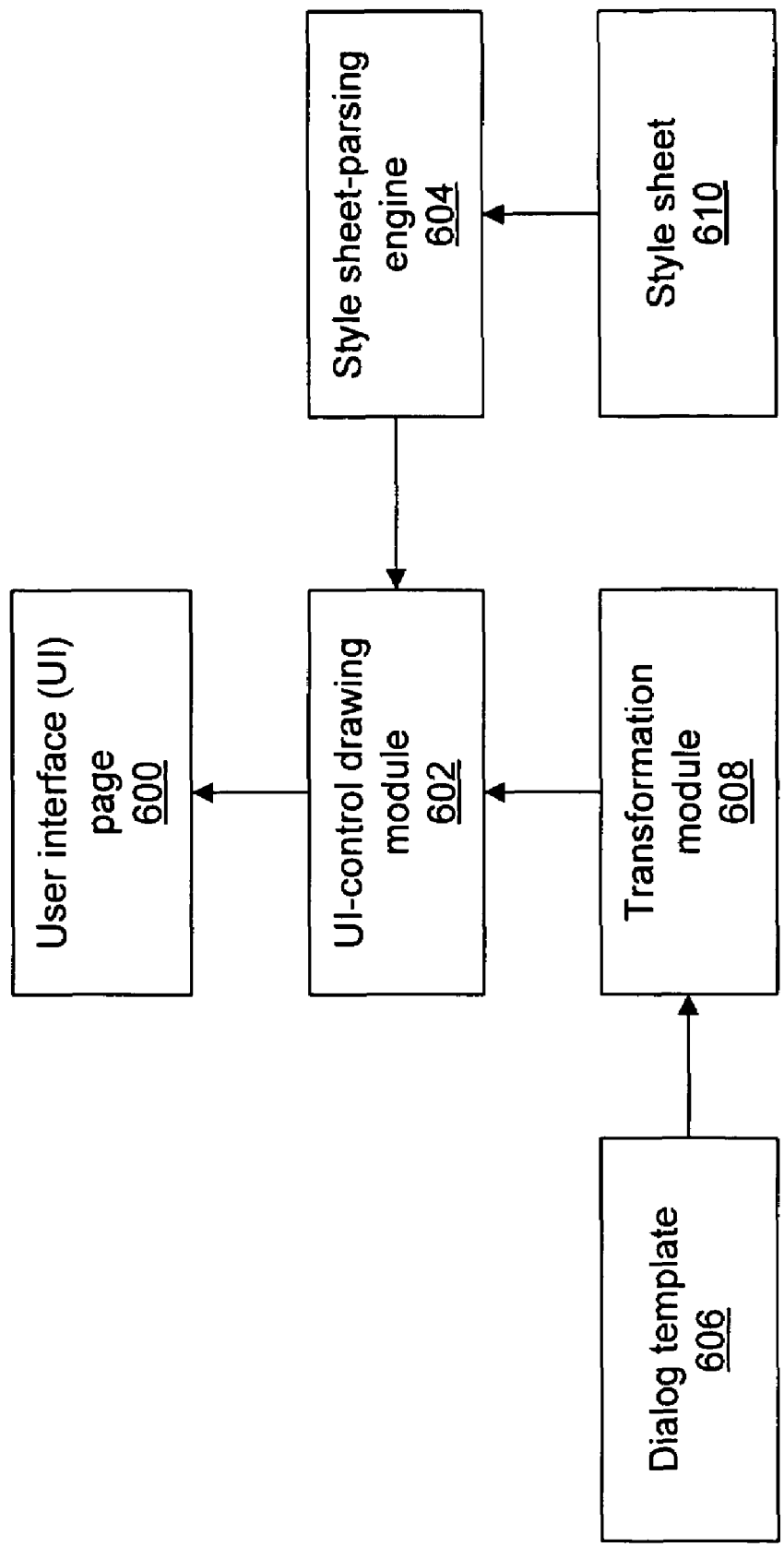
FIG. 6 is a block diagram of a system for defining the visual appearance of UI controls in accordance with various embodiments of the invention.

Referring to FIG. 6, which depicts a system for defining the visual appearance of UI controls in accordance with various embodiments of the invention, the definition of the dialog is saved in a dialog template 606, which may be a Windows® Resource File (.rc) containing text. The dialog template 606 may describe which controls appear on a page and may specify some properties of the controls, such as that a control is a button and that the button has the text "OK" inside of it. Next, the text file is compiled into a binary file format (.res) and linked into an executable (.exe) or dynamic link library (.dll).

An application developer may take advantage of modifiable controls (by having the transformation module 608 operate on a stock dialog template 606). To implement modifiable controls in accordance with embodiments of the invention, an application programmer may build the following components once: UI page 600, UI-control module 602, style sheet-parsing engine 604, transformation module 608 and style sheet 610. Someone who uses modifiable controls in accordance with embodiments of the invention may then just supply a dialog template 606; whereas, someone wanting highly-customized modifiable controls may re-implement at least the dialog template 606, the UI-control drawing module 602, and at least a portion of the UI page 600 each time. After the visual design of the dialog is complete, a developer implementing modifiable controls in accordance with embodiments of the invention may write the source code that draws the controls used on the dialog. Source code of this type is depicted in FIG. 6 as UI-control drawing module 602. Depending upon the level of control the developer wants over various controls, the source language preference (e.g., C/C++ vs. Visual Basic® vs. J++), and the set of APIs (e.g., native Win32® vs. Microsoft Foundation Class (MFC) Library) the developer wants to use, there are a number of ways a developer can hook into an operating system, such as a Windows®-based operating system, and take over responsibility for processing messages and drawing the controls. In accordance with various embodiments of the invention, code may be written in C/C++ using Active Template Library (ATL)/Windows® Template Library (WTL), which can be thought of as wrappers around Win32® API's. Other programming languages and/or technologies may also be used to create and/or take advantage of modifiable controls in accordance with embodiments of the invention.

Figure 2:
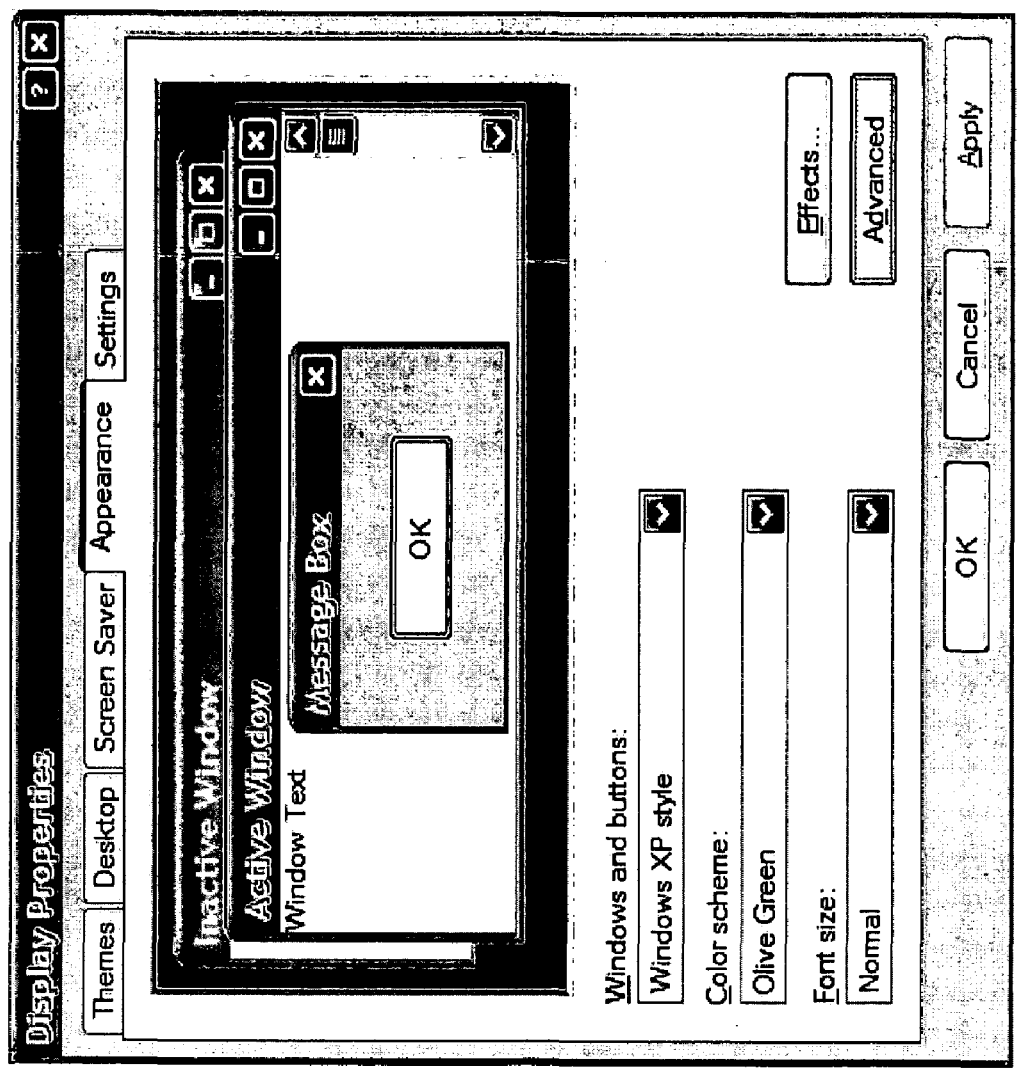
FIG. 2 shows a Control Panel Display applet that can used to make relatively limited changes to UI color schemes.
Figure 4:
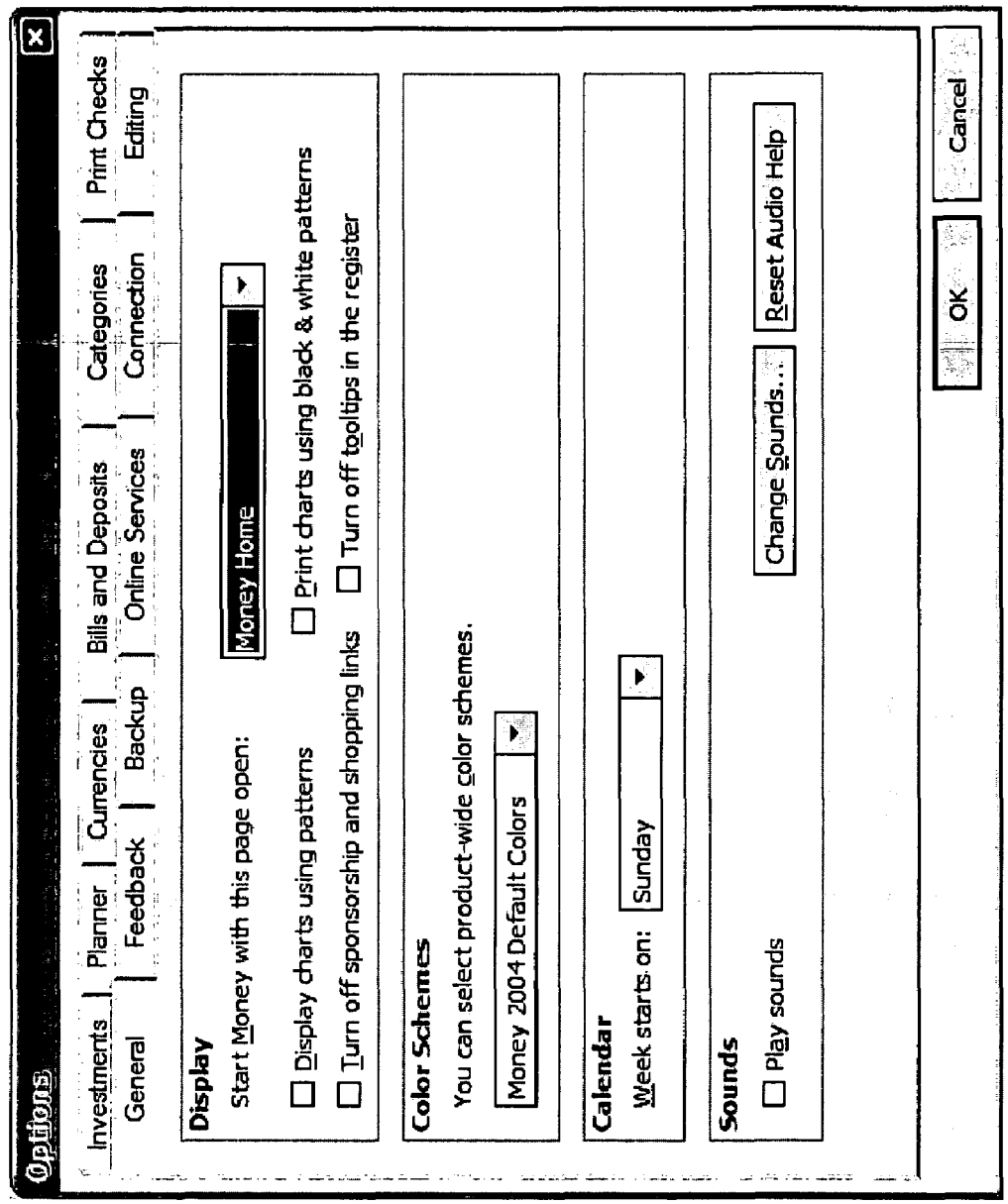
FIG. 4 shows an example UI page in the form of a dialog with custom controls.

While writing the source code to draw the control, the developer will typically address issues related to the visual appearance of UI controls, such as: What color should the text be? Which font should be used? From where should these values be retrieved? By default, Windows®-based operating systems use values from the system metrics, which may be set by the user via the Control Panel Display applet, an example of which is shown in FIG. 2. Developers can use these system metrics, or they can specify their own.

In accordance with various embodiments of the invention, the code that draws the control (depicted as UI-control drawing module 602) makes calls to a style sheet-parsing engine 604 that, in turn, fetches the values from a style sheet 610.

Instead of the conventional methodology of specifying visual-display properties in resource files 606 or in a UI-control drawing module 602, which draws the controls on the screen, at least some of the visual properties of UI controls are moved into the style sheet 610, which is itself a text file. The style—sheet-parsing engine 604 reads the style sheet 610 and gives the properties back to UI-control drawing module 602. The style sheet-parsing engine 604 may allow custom attributes to be included in the style sheet 610. Such custom attributes may be passed through to the UI-control drawing module 602 unchanged.

Whether a button should be present on a UI page may be specified in the dialog template 606, not the style sheet 610. The dialog template may be loaded from a resource file or created dynamically. Visual display properties, such as the background color of a button, are specified in the style sheet 610.

The dialog template 606 can be thought of as analogous to the architecture of a building, and the style sheet 610 can be thought of as analogous to the building's interior design. The architecture lays out what controls are on a page and other information such as callbacks to code that handle the events on the controls. This is analogous to a building's framework.

The interior design is analogous to paint on interior walls and carpeting—essentially visual and cosmetic in nature. The style sheet 610 specifies visual-appearance properties of UI controls. The style sheet 610 does not typically change structural things specified in the dialog template 606.

In accordance with various embodiments of the invention, the style sheet-parsing engine 604 may understand syntax and semantics that are substantially equivalent to Cascading-Style-Sheet syntax and semantics as defined by the W3C's CSS1 recommendation. As will be apparent, other syntax and semantics may also be used. By using such a style sheet-parsing engine 604, a platform-specific application program, such as a Win32®-based program, can be made to work in a way similar to how an HTML page does, with respect to specifying visual display properties of UI controls. Cascading Style Sheets (CSS) is a relatively simple mechanism for adding style (e.g. fonts, colors, spacing, etc.) to HTML web pages. The visual appearance of Windows common controls, however, has not conventionally been defined via CSS-like syntax and semantics.

In accordance with various embodiments of the invention, the drawing routines (depicted as UI-control drawing module 602 in FIG. 6) of the modifiable controls may be written to pull style information from the style sheet 610 via the style sheet-parsing engine 604. Modifiable controls may support standard style elements and/or new custom properties.

IV. Modifiable-Control Tag Name

In accordance with various embodiments of the invention, there may be a one-to-one mapping between modifiable controls and standard Windows® controls. The following table contains an abbreviated list comparing a few examples of modifiable-control tag names and window class names:

| Window<br>Class Name | Modifiable-Control<br>Tag Name |
|---|---|
| Pushbutton | MoneyPushButton |
| GroupBox | MoneyColorBox |
| ComboBox | MoneyComboBox |

A style selector may be composed of up to two parts: a tag name (TAG), and a class attribute (CLASS). For Win32® controls, the tag name may be the window class name (as passed to CreateWindowEx). The tag name may specify the type of control, such as "button" in a manner similar to an HTML tag. The style selector may include the tag name or the class attribute or both the tag name and the class attribute. The style selector may impart a hierarchical structure to the visual-display properties.

For example, assume the Cancel button were defined in the dialog template 606 as such:

PUSHBUTTON "Cancel",IDCANCEL,178,240,50,14.

Munging module 608 parses the dialog template 606 and dynamically replaces the window class name Button listed in the dialog template with the equivalent modifiable-control tag name MoneyPushButton. The visual appearance of the Cancel button may be specified in the style sheet 610 in the following way:

MoneyPushButton {background-color:RGB(255,0,0);}

MoneyPushButton serves as a style selector within the style sheet. Other than the definition of the Cancel button, the foregoing example applies to buttons generally, as opposed to the Cancel button specifically.

V. Modifiable-Control Style-Class Attributes

In addition to the tag name, each modifiable control may be given a modifiable-control style-class attribute to further customize the visual appearance in a way that is specific to the context of the modifiable control. In the dialog template 606, the modifiable-control style-class attribute may be embedded between two sets of double-curly braces within the text string associated with the caption (or title) of the control.

```
IDD_TEST DIALOG 0, 0, 341, 263
STYLE DS_SETFONT | DS_MODALFRAME | DS_CENTER |
WS_CAPTION | WS_SYSMENU
CAPTION "Test Dialog"
FONT 8, "Tahoma"
BEGIN
    DEFPUSHBUTTON
    "OK{{class=BankingBtn}}",IDOK,112,240,50,14
    PUSHBUTTON
    "Cancel{{class=BankingBtn}}",IDCANCEL,178,240,50,14
END
```

For buttons of type BankingBtn (i.e., the OK pushbutton and the Cancel pushbutton), the window class name Button is dynamically replaced with the equivalent modifiable-control tag name MoneyPushButton. BankingBtn is the class attribute for the buttons. To override the default MoneyPushButton's background color, for example, one would define the BankingBtn class for MoneyPushButton in the style sheet 610 as follows:

MoneyPushButton.BankingBtn {background-color:RGB(0, 0,0);}

In the example dialog template above, the information within the double curly braces specifies the class attribute, which is contained in the style sheet 610, from which visual display properties for the UI control will be retrieved. So, in that example, there are style-class attributes in the dialog template 606 (values for which are defined in the style sheet 610) for the style MoneyPushButton.BankingBtn. So, the class attribute in the example dialog template above essentially indicates that, when the UI button control is drawn on the screen at a later time, the UI-control drawing module 602 should get visual-display information, such as the background color, from the MoneyPushButton.BankingBtn rule in the style sheet 610. In other words, the transformation module 608 extracts style-class-attribute information from the dialog template 606 and stores it for later use.

Transformation module 608 may perform this functionality between the time that a user requests an action to display a dialog on the screen and when the dialog is displayed on the screen. Or this functionality may be performed at an earlier point and the results may be cached. Then, if the style sheet has changed when controls are being drawn, the transformation module 608 processes the revised style-sheet contents. So, for example, if a user selects Help About, then, at that point, the operating system starts to load the dialog, creates the template, and extracts the modifiable-control style-class attributes.

The following code example is similar to the example above. But the example below defines two different types of banking buttons, which have two different class attributes, thus may refer to different style rules and inherit separate display properties, such as background color.

```
IDD_TEST DIALOG2 0, 0, 341, 263
STYLE DS_SETFONT | DS_MODALFRAME | DS_CENTER |
WS_CAPTION | WS_SYSMENU
CAPTION "Test Dialog"
FONT 8, "Tahoma"
BEGIN
    DEFPUSHBUTTON
    "OK{{class=BankingBtn1}}",IDOK,112,240,50,14
    PUSHBUTTON
    "Cancel{{class=BankingBtn2}}",IDCANCEL,178,240,50,14
END
```

For the OK and Cancel pushbuttons, the Windows class name "Button" is dynamically replaced with the equivalent modifiable-control tag name MoneyPushButton. BankingBtn1 and BankingBtn2 are the respective class attributes for the OK and Cancel pushbuttons. To override the default MoneyPushButton's background color, for example, one would define the BankingBtn1 and BankingBtn2 classes for MoneyPushButton in the style sheet as follows:

MoneyPushButton.BankingBtn1 {background-color:blue;}
MoneyPushButton.BankingBtn2 {background-color: green;}

Transformation module 608 parses the dialog template 606 for information, such as a class attribute contained within the double curly braces. Information of this type may be extracted from the dialog template 606. The extracted information, such as a class attribute, may then be attached to (or associated with) a UI control. The extracted information may then be used later on, when the UI control is drawn on the UI page 600 to retrieve pertinent stylistic information specifying one or more visual display characteristics of the UI control.

As will be apparent, syntax conventions other than the one discussed and shown in the example above may be used for specifying a modifiable-control style-class attribute. Class attributes may also be supplied at run-time, to override those defined in the resource files, or to supply attributes to controls created dynamically.

Figure 10:
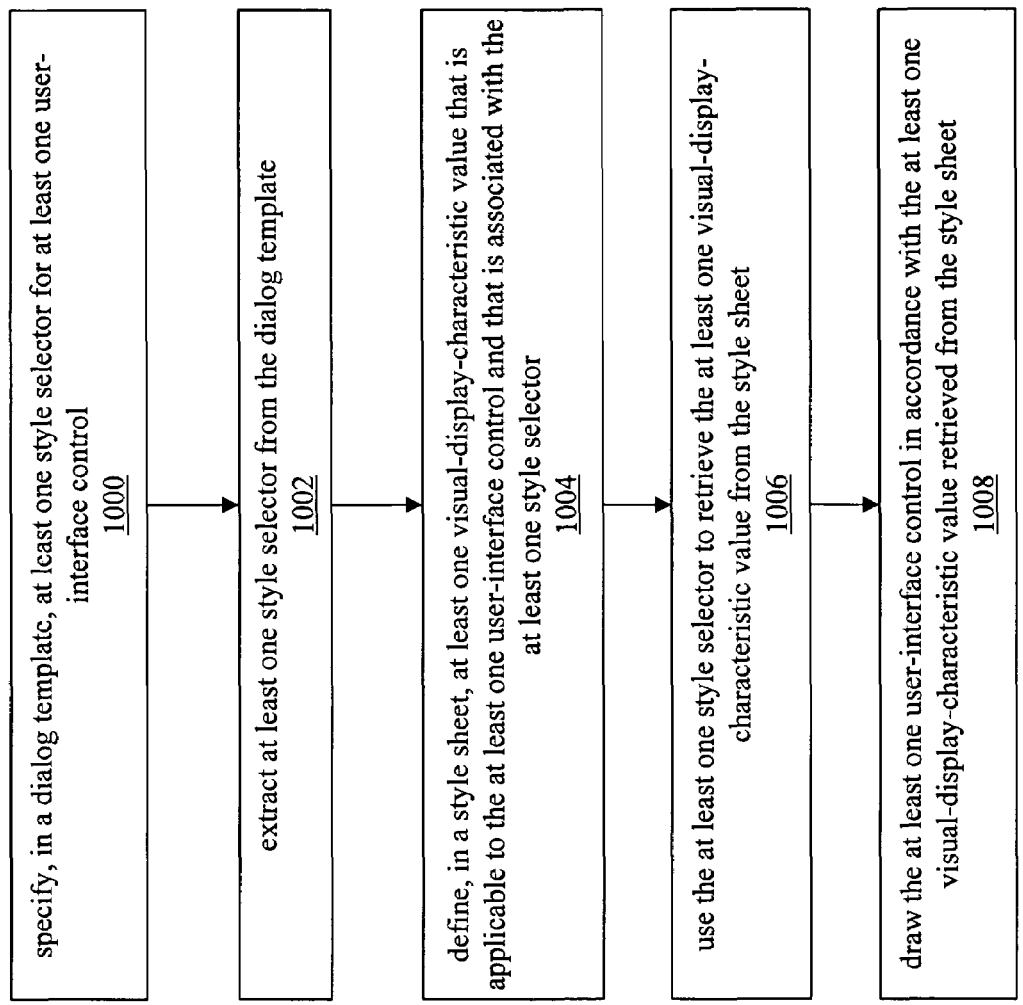
FIG. 10 is a flowchart showing steps for defining the visual appearance of UI controls in accordance with various embodiments of the invention.

FIG. 10 is a flowchart depicting steps for defining the visual-display characteristics for user-interface controls in accordance with various embodiments of the invention. At least one style selector (composed of a tag name or a tag name and a class attribute) for at least one user-interface control is specified in a dialog template, as depicted at 1000. At least one style selector is extracted from the dialog template, as depicted at 1002. At least one visual-display-characteristic value that is applicable to the at least one user-interface control and that is associated with the at least one style selector is defined in a style sheet, as depicted at 1004. The at least one style selector is used to retrieve the at least one visual-display-characteristic value from the style sheet, as depicted at 1006. And, finally, the at least one user-interface control is drawn in accordance with the at least one visual-display-characteristic value retrieved from the style sheet 1008.

VI. Implementation Details of Exemplary Modifiable Controls

In accordance with various embodiments of the invention, modifiable controls may be registered as Windows class, providing custom Window Procedure (commonly referred to as a WndProc) for various types of modifiable controls. Windows® provides the default WndProc for the common controls, such as a button. The custom WndProc used by modifiable controls is based on the Windows® default WndProc. The custom WndProc provides custom handling for virtual appearance-related messages and forwards other messages to the default WndProc for processing.

A C++ class may also be created for each of various control types. These C++ classes may contain methods and properties for handling the creation, management, and destruction of instances of a control.

Before a modifiable control is displayed on the computer screen, Windows® sends an NC_CREATE message to the custom WndProc registered for that modifiable-control window class. In other words, if a dialog has three buttons, Windows® calls the window class's WndProc three times to create three instances of the button control. The custom WndProc creates an instance of the C++ class for each instance of a control.

The modifiable-control style-class attribute is removed from the text string defining the control's caption and copied into one of the private members of the C++ class. For example, if the Cancel button were defined as such:
PUSHBUTTON "Cancel{{class=bankingbtn}}",IDCANCEL,178,240,50,14 the modifiable-control style-class attribute would be set to "bankingbtn". The control caption would be set to "Cancel".

VII. Drawing the Control

When the C++ class receives the instruction to draw the control, the C++ class calls into the style sheet-parsing engine 604 and requests the style properties and values for that control. For example, if the modifiable-control style-class attribute of one instance of a MoneyPushButton control is "BankingBtn", the C++ class asks the style sheet-parsing engine 604 to fetch the properties, such as foreground color, background color, borders, font, font properties other than font family, background image, etc. listed in the MoneyPushButton.BankingBtn style in the style sheet 610.

VIII. Optimizations

In accordance with various embodiments of the invention, optimizations may be included. For instance, the style sheet-parsing engine 604 may load and parse the style sheet 610 once. The style sheet-parsing engine 604 caches the style properties and values in anticipation of future requests from other instances of controls. Loading and parsing a text file during application startup can be relatively slow. In accordance with various embodiments of the invention, the style sheet-parsing engine 604 reads external text files (.css) and a pre-compiled binary form of the file stored in a resource DLL (.dll). Loading the pre-compiled style sheets significantly improves application startup time.

The C++ class representing an instance of a control may cache the visual display attributes, instead of requesting them from the style sheet-parsing engine 604 every time the control needs to be redrawn.

IX. Inheritance

In accordance with various embodiments of the invention, modifiable controls may support various levels of inheritance. For example, four possible levels of inheritance (from least specific to most specific) are: (1) application-wide (or global), (2) area-specific, (3) dialog-specific, and (4) control-specific. As discussed above, each control may have its own modifiable-control style-class name; this is the control-specific level. More specific levels override less specific levels.

A control may exist on a dialog. A dialog can be assigned a modifiable-control style-class attribute. A dialog can be thought of as a canvas upon which controls are placed. Some of the style properties may be specific to the canvas or dialog, such as a background color. It may be intended that some of the dialog-style properties, such as font, be inherited by the controls on the dialog.

This type of inheritance is analogous to use of contextual CSS style selector. For example, a pushbutton could appear inside a colorbox, or inside a dialog. If it is desired that the buttons inside the colorbox be blue, and that the buttons in the dialog be green, style-sheet definitions like the following may be used:
COLORBOX PUSHBUTTON {background-color: blue;}
DIALOG PUSHBUTTON {background-color: green;}

Or, if blue buttons are desired on blue colorboxes, and green buttons are desired on green colorboxes, but orange buttons are desired outside of colorboxes, style-sheet definitions like the following may be used:

PUSHBUTTON {background-color: orange;}
COLORBOX.blue {background-color: #ddf0ff;}
COLORBOX.green {background-color: # defdd5;}
COLORBOX.blue PUSHBUTTON {background-color: blue;}
COLORBOX.green PUSHBUTTON {background-color: green;}

If it is desired that only a special kind of button should be blue or green if they are in colorboxes, style-sheet definitions like the following may be used:
PUSHBUTTON {background-color: orange;}
COLORBOX.blue {background-color: #ddf0ff;}
COLORBOX.green {background-color: # defdd5;}
COLORBOX.blue PUSHBUTTON.special {background-color: blue;}
COLORBOX.green PUSHBUTTON.special {background-color: green;}

Normal buttons inside either colorbox would be orange, but special buttons would be blue or green, depending on the colorbox.

Figure 7:
FIGS. 7 and 8 show different color schemes for corresponding UI areas of different sections of an application program.
Figure 8:
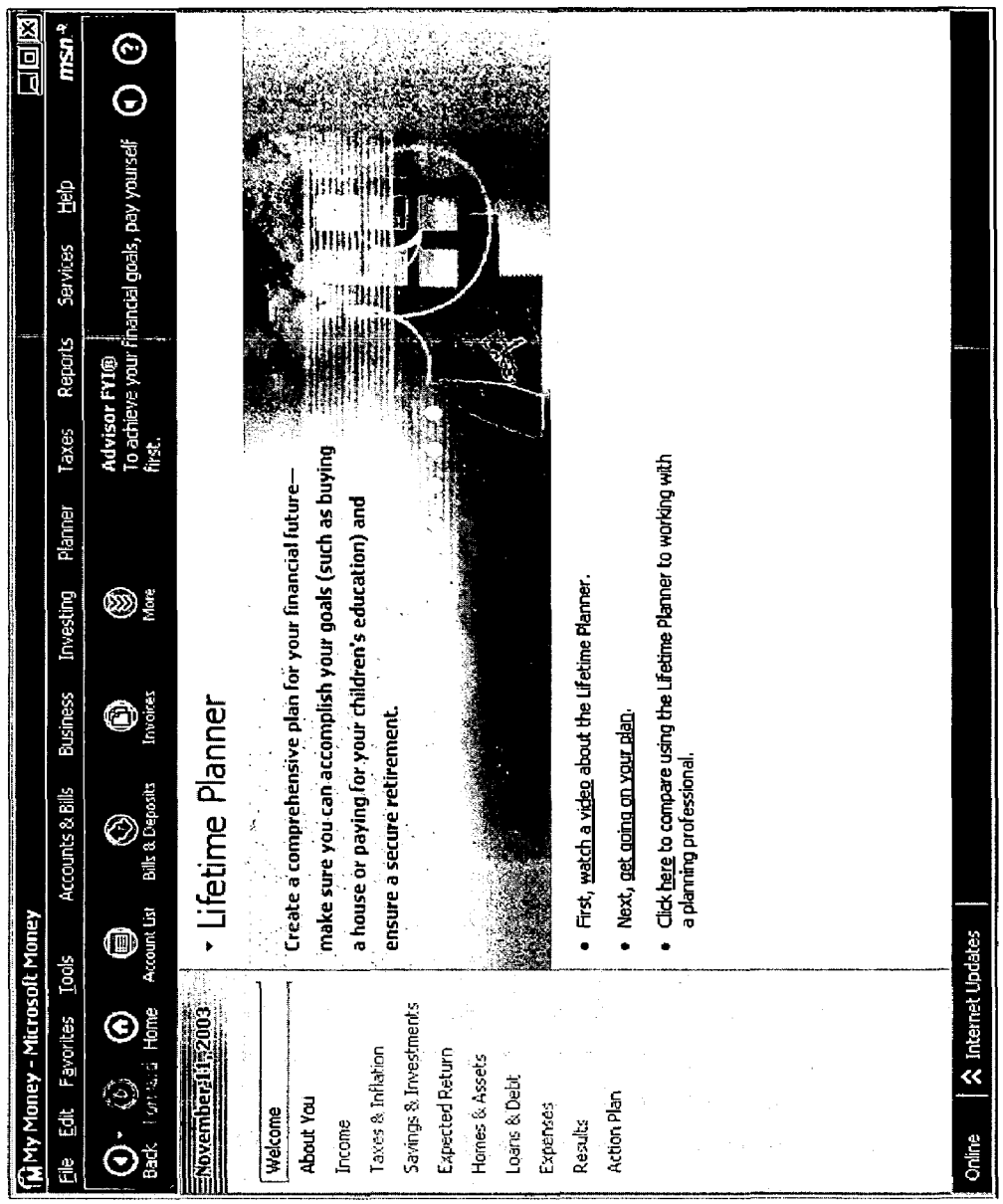

Multiple dialogs may belong to an area within an application program. For example, in Microsoft® Money, different color schemes may be used for different areas of the application. The dialogs related to investing (an example of which is shown in FIG. 7) may be colored blue, and the planning pages (an example of which is shown in FIG. 8) may be colored mauve.

When loading an HTML page or a Win32® dialog, Microsoft® Money overlays a global style sheet with a page-specific style sheet that contains settings specific to the pages and controls within the area. Through a model for cascading styles from the dialog level down to the controls level, the properties within the page-specific style sheet override the defaults defined in the global style sheet. The syntax of a model for cascading styles may be equivalent to the use of contextual selectors as defined in the W3C CSS1 recommendation. As will be apparent, other syntax may be used.

Finally, the application (or global) level is the most general (i.e., the least specific). For example, the buttons in Microsoft Money have a common appearance. In the style sheet, the visual appearance of "MoneyPushButton" is defined. Each button in the application inherits these style settings. As previously discussed, though, styles may be overridden at one or more of the lower (i.e., more specific) levels. For instance, at the "application" level, the toolbar, left-navigation region, and the status bar at the bottom of the dialog may be set to pink. At each of the "areas" levels, the toolbar, the left-navigation region, and the status-bar colors may be reset: banking may be set to green, investing may be set to blue, and the like.

In accordance with embodiments of the invention, properties may be set on groups of controls of the same type. Visual characteristics of conventional custom controls are typically specified in code that cannot be changed by the end user such that re-branding (i.e., matching a set of predefined visual-display characteristics, such as the visual appearance of an existing Web site) of the visual appearance of the user interface is not facilitated. In accordance with various embodiments of the invention, because the style sheet 610 is a text file that is shipped with the application program, a user and/or re-distributor, such as a financial institution, of the application program, can edit the text file (i.e., the style sheet), restart the application and change visual-display characteristics of various UI controls as desired. The user can customize the visual appearance of the application relatively easily. The ability to customize the visual appearance of the application is no longer dependant on intimate technical knowledge of the application's components. After changing the visual-display characteristics specified in the style sheet, the application can be restarted, without having to recompile the application program, and the revised visual-display characteristics will take effect. The combination of pre-compiled style sheets stored in an application's resources with additional style sheets left in text format also allows some measure of control over which aspects of the application's appearance are customizable by a third party.

X. Using Modifiable Controls in HTML Web Pages

An application program developed in accordance with various embodiments of the invention may host pages developed as Win32® windows and/or pages developed as HTML pages. In order to ensure consistency in the user experience and the style sheet definitions between these two types of pages, the style-sheet support may be added to the modifiable controls in such a manner as to be as consistent as possible with existing HTML/CSS syntax rules. A set of binary behaviors and ActiveX controls may be used in place of traditional HTML control elements. Binary behaviors may be developed for simple controls, such as buttons, and ActiveX controls may be developed for more complicated controls, such as menus and toolbars.

Techniques for turning a Win32® control into an ActiveX® control are known in the art. Internet Explorer's (IE's) binary behaviors can be thought of as ultra-light ActiveX® controls. IE does some of the work for the developer. However, in all three cases (Win32®, ActiveX® control and binary behaviors), the developer may write the code that draws the user-interface controls. For binary behaviors, there is a mechanism between the user agent and binary behavior to determine who draws the user-interface controls. The source code for redrawing each of these flavors of user-interface controls is similar.

Figure 9:
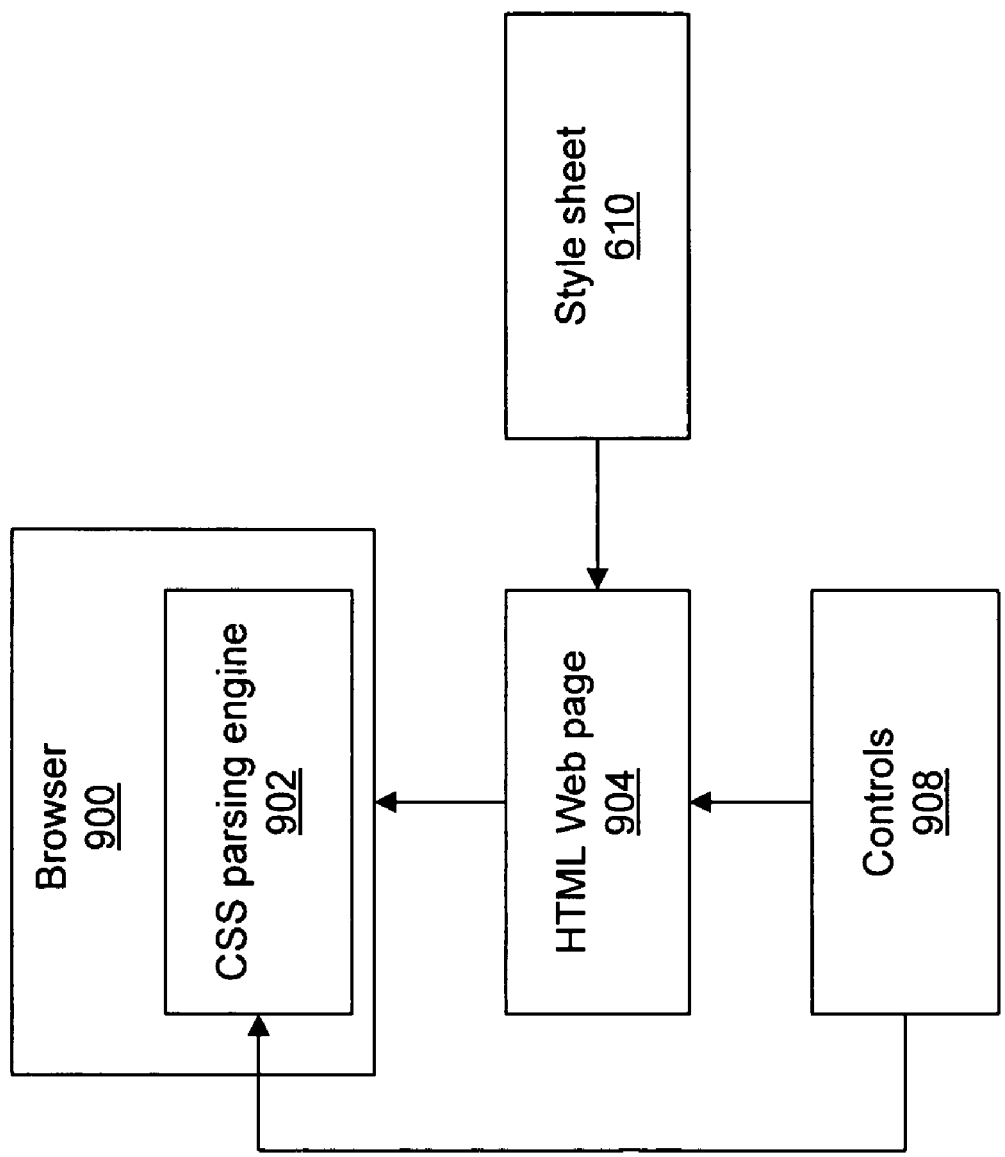
FIG. 9 is a block diagram of a system for defining the visual appearance of UI controls in accordance with various embodiments of the invention.

Referring to FIG. 9, the HTML page 904 is a text file, and the user agent 900 is what's used to draw the HTML page 904 onto a user's display screen. The HTML page 904 is similar to the dialog template 606 in that it specifies the controls on a page and the layout with respect to how things are organized on a page. The style sheet 610 may be used for specifying the visual properties of UI controls. In this way, both a regular HTML page 904 and a Win32®-based UI page 600 may use a common style sheet 610. A Style sheet 610 may also be fed as input to the user agent 900 directly.

XI. Comparison of Win32® and HTML Implementations

For HTML pages, instead of creating a Windows® resource file, a developer creates an HTML page that includes a list of user-interface controls to include as well as the layout information. For visual appearance options, the HTML source code may refer to styles defined in the style sheet used by the Win32® dialogs. The styles may be referred to by tag name and class attribute. If these selectors are consistent with those defined in resource files for Win32 pages, then the appearance of the controls will be the same across both types of pages. This may be done so that, if the visual appearance of a button is changed in the common style sheet, all instances of the button control will reflect the changes regardless of whether the button resides in a Win32® dialog or in an HTML web page.

For each instance of a control referenced in the HTML, the developer may add the modifiable-control style-class name in the following way:
<input type="button" class="className" value="Cancel">

When the HTML rendering engine of a user agent 900, such as Microsoft® Internet Explorer (IE), loads the HTML page, the rendering engine also loads the style sheet 610, any binary behaviors, and any ActiveX® controls (collectively depicted as controls 908 in FIG. 9) referenced in the HTML page 904. The user agent 900 may have its own Cascading Style Sheet (CSS) parsing engine 902. Each time a binary behavior or ActiveX® user-interface control redraws itself, it may call into the user agent's CSS-parsing engine 902 to request its set of properties and values. The parsing engine 902 may then find the external style sheet referenced in the HTML page 904 and fetch the requested style information.

XII. Concluding Remarks

What has been described above is merely illustrative of the application of the principles of the invention. Those skilled in the art can implement other arrangements and methods without departing from the spirit and scope of the present invention. Any of the methods of the invention can be implemented in software that can be stored on computer disks or other computer-readable media.

We claim:

1. A system for defining at least one visual-display characteristic of at least one user-interface control, the system comprising:
 a dialog template that specifies at least one style selector for the at least one user-interface control, wherein the style selector includes at least one of: (1) a tag name, and (2) a tag name and a class attribute;
 a transformation module that extracts the at least one style selector from the dialog template;
 a style sheet that defines at least one visual-display-characteristic value that is applicable to the at least one user-interface control and that is associated with the at least one style selector;
 a style sheet-parsing engine that uses the at least one style selector to retrieve the at least one visual-display-characteristic value from the style sheet; and
 a user-interface-control-drawing module that draws the at least one user-interface control in accordance with the at least one visual-display-characteristic value retrieved by the style sheet-parsing engine.

2. The system of claim 1, wherein the dialog template specifies a location within a displayed user-interface page of the at least one user-interface control.

3. The system of claim 2, wherein the user-interface page is at least one of an HTML page and a platform-specific user-interface display page.

4. The system of claim 1, wherein the style sheet defines the at least one visual-display-characteristic value in accordance with syntax and semantics that are substantially equivalent to Cascading-Style-Sheet syntax and Cascading-Style-Sheet semantics, respectively.

5. The system of claim 1, wherein the at least one visual-display-characteristic value includes a value for at least one visual-display characteristic selected from the group consisting of: foreground color, background color, borders, font, font properties other than font family, and background image.

6. The system of claim 1, wherein the at least one visual-display-characteristic value overrides at least one inherited visual-display-characteristic.

7. The system of claim 6, wherein the at least one inherited visual-display-characteristic is defined at a level that is less specific than the at least one visual-display-characteristic value.

8. The system of claim 6, wherein the less-specific level is selected from the group consisting of: application-wide, area-specific, and control-specific.

9. The system of claim 1, wherein the style sheet-parsing engine retrieves from the style sheet and caches at least one visual-display-characteristic value for at least one additional user-interface control.

10. The system of claim 1, wherein the style sheet-parsing engine retrieves the at least one visual-display-characteristic value from a pre-compiled binary form of the style sheet.

11. At least one computer-readable medium containing computer-readable instructions for defining at least one visual-display characteristic for at least one user-interface control, wherein, when executed, the computer-executable instructions perform steps comprising:
 specifying, in a dialog template, at least one style selector for the at least one user-interface control, wherein the style selector includes at least one of: (1) a tag name, and (2) a tag name and a class attribute;
 extracting the at least one style selector from the dialog template; defining, in a style sheet, at least one visual-display-characteristic value that is applicable to the at least one user-interface control and that is associated with the at least one style selector;
 using the at least one style selector to retrieve the at least one visual-display-characteristic value from the style sheet; and
 drawing the at least one user-interface control in accordance with the at least one visual-display-characteristic value retrieved from the style sheet.

12. The at least one computer-readable medium of claim 11, wherein the dialog template specifies a location within a displayed user-interface page of the at least one user-interface control.

13. The at least one computer-readable medium of claim 12, wherein the user-interface page is at least one of an HTML page and a platform-specific user-interface display page.

14. The at least one computer-readable medium of claim 11, wherein the style sheet defines the at least one visual-display-characteristic value in accordance with syntax and semantics that are substantially equivalent to Cascading-Style-Sheet syntax and Cascading-Style-Sheet semantics.

15. The at least one computer-readable medium of claim 11, wherein the at least one visual-display-characteristic value includes a value for at least one visual-display characteristic selected from the group consisting of: foreground color, background color, borders, font, font properties other than font family, and background image.

16. The at least one computer-readable medium of claim 11, wherein the at least one visual-display-characteristic value overrides at least one inherited visual-display-characteristic.

17. The at least one computer-readable medium of claim 16, wherein the at least one inherited visual-display-characteristic is defined at a level that is less specific than the at least one visual-display-characteristic value.

18. The at least one computer-readable medium of claim 17, wherein the less-specific level is selected from the group consisting of: application-wide, area-specific, and control-specific.

19. The at least one computer-readable medium of claim 11, containing computer-readable instructions that, when executed, perform steps comprising: retrieving from the style sheet and caching at least one visual-display-characteristic value for at least one additional user-interface control.

20. The at least one computer-readable medium of claim 19, wherein the step of retrieving the at least one visual-display-characteristic value further comprises retrieving the at least one visual-display-characteristic value from a pre-compiled binary form of the style sheet.

21. The at least one computer-readable medium of claim 11, wherein the step of retrieving the at least one visual-display-characteristic value further comprises retrieving the at least one visual-display-characteristic value from a pre-compiled binary form of the style sheet.

22. A method of defining at least one visual-display characteristic for at least one user-interface control, the system comprising:
  specifying, in a dialog template, at least one style selector for the at least one user-interface control;
  extracting the at least one style selector from the dialog template; defining, in a style sheet, at least one visual-display-characteristic value that is applicable to the at least one user-interface control and that is associated with the at least one style selector;
  using the at least one style selector to retrieve the at least one visual-display-characteristic value from the style sheet; and
  drawing the at least one user-interface control in accordance with the at least one visual-display-characteristic value retrieved from the style sheet.

23. The method of claim 22, wherein the dialog template specifies a location within a displayed user-interface page of the at least one user-interface control.

24. The method of claim 23, wherein the user-interface page is at least one of an HTML page and a platform-specific user-interface display page.

25. The method of claim 22, wherein the style sheet defines the at least one visual-display-characteristic value in accordance with syntax and semantics that are substantially equivalent to Cascading-Style-Sheet syntax and Cascading-Style-Sheet semantics.

26. The method of claim 22, wherein the at least one visual-display-characteristic value includes a value for at least one visual-display characteristic selected from the group consisting of: foreground color, background color, borders, font, font properties other than font family, and background image.

27. The method of claim 22, wherein the at least one visual-display-characteristic value overrides at least one inherited visual-display-characteristic.

28. The method of claim 27, wherein the at least one inherited visual-display-characteristic is defined at a level that is less specific than the at least one visual-display-characteristic value.

29. The method of claim 28, wherein the less-specific level is selected from the group consisting of: application-wide, area-specific, and control-specific.

30. The method of claim 22, further comprising: retrieving from the style sheet and caching at least one visual-display-characteristic value for at least one additional user-interface control.

31. The method of claim 22, wherein the step of retrieving the at least one visual-display-characteristic value further comprises retrieving the at least one visual-display-characteristic value from a pre-compiled binary form of the style sheet.

* * * * *